T. J. Chubb.
Furnace.
Nº 64,947. Patented May 21, 1867.
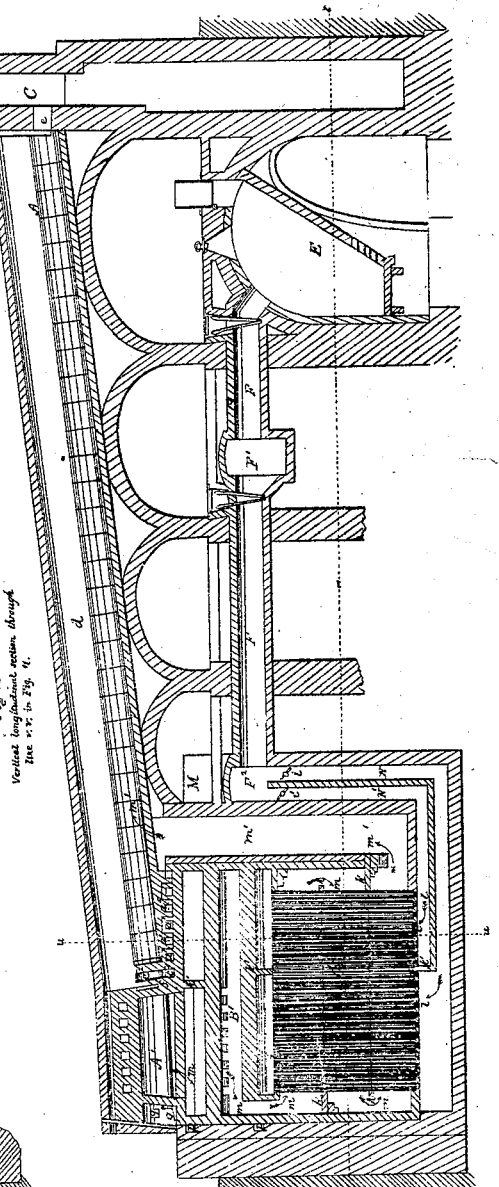

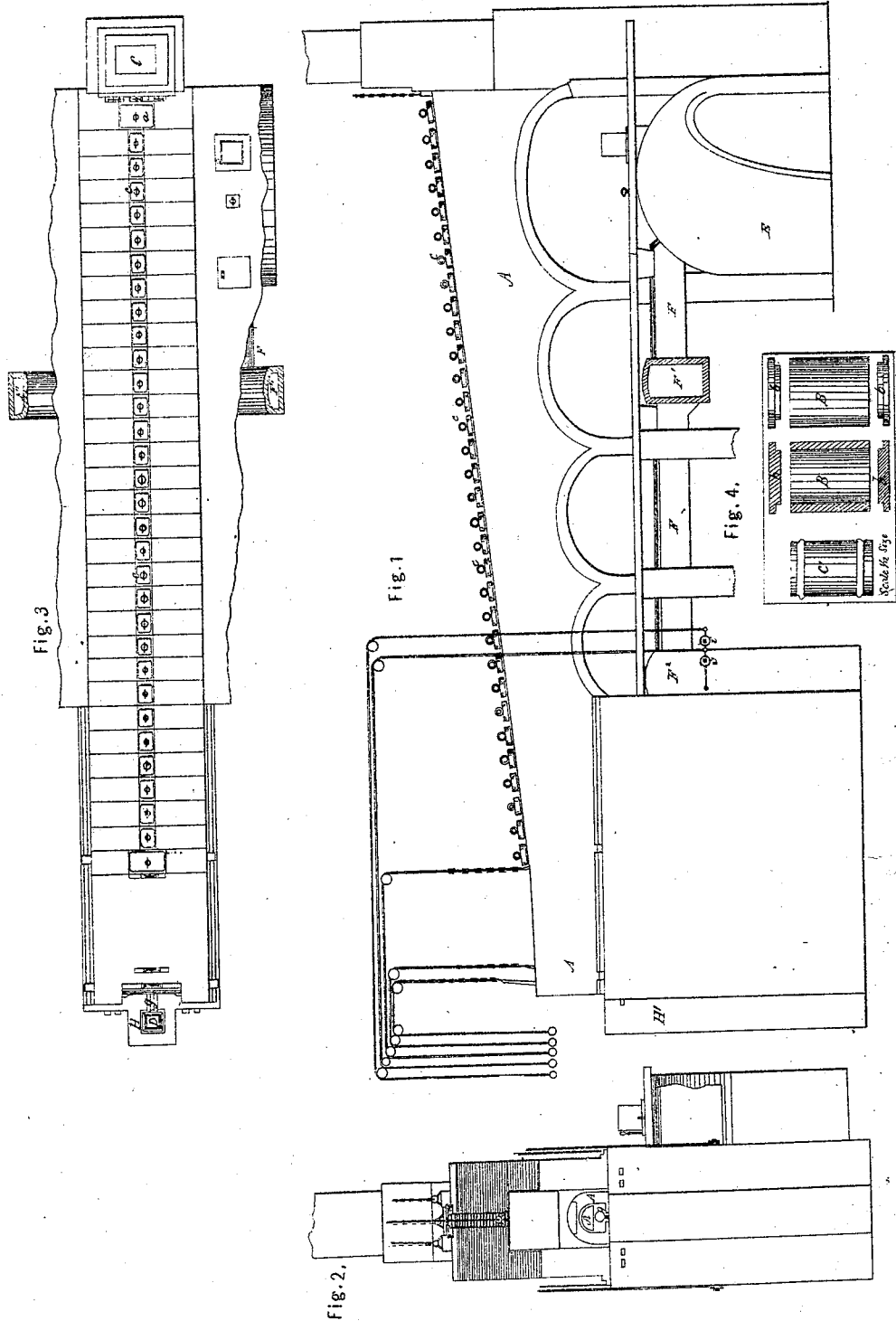

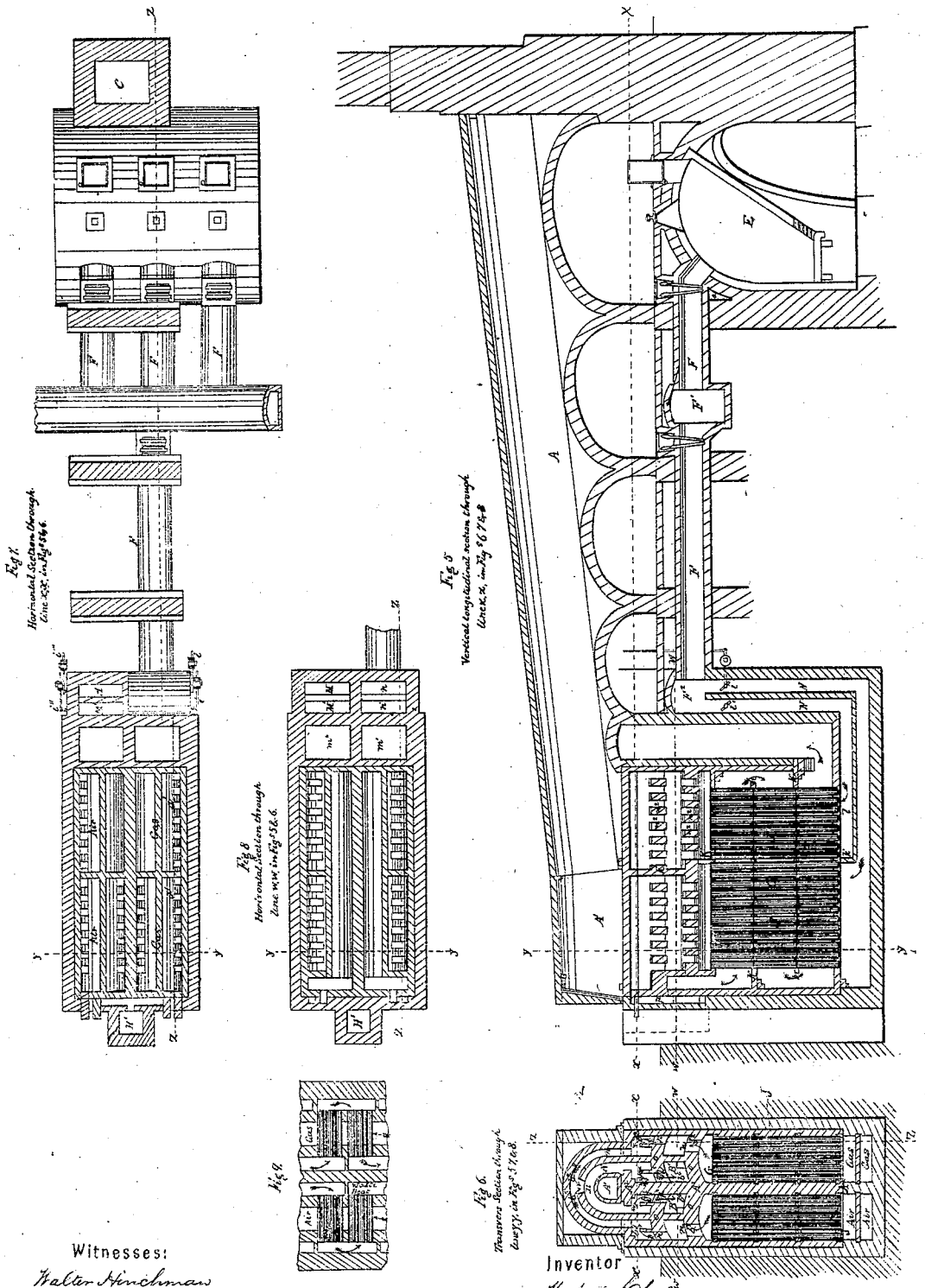

UNITED STATES PATENT OFFICE.

THOMAS J. CHUBB, OF BROOKLYN, E. D., NEW YORK.

IMPROVED APPARATUS FOR ACCUMULATING AND RECLAIMING HEAT.

Specification forming part of Letters Patent No. 64,947, dated May 21, 1867.

*To all whom it may concern:*

Be it known that I, THOMAS J. CHUBB, of Brooklyn, E. D., in the county of Kings and State of New York, have invented a Calorific Accumulating and Reclaiming Apparatus; and I do hereby declare the following to be a full, clear, and exact description thereof, reference being had to the accompanying drawings, making part of this specification, in which—

Figure 1, Sheet 1, represents a longitudinal exterior elevation of a furnace, showing a gas-generator, a gas and air heating apparatus, the calorific reclaimer and accumulator, and a steel converting and melting furnace or chamber attached. Fig. 2 is a front elevation of the apparatus. Fig. 3 is a plan view of Fig. 1. Fig. 4 are views showing the construction of molds which are designed for packing and solidifying fine dust, peat, or other fine fuel which may be used in the gas-generating furnace. Fig. 5, Sheet 2, is a longitudinal section of the entire apparatus, taken in the vertical plane indicated by dotted line $z\ z$ in Figs. 6, 7, and 8. Fig. 6 is a transverse section through the reclaimer and accumulator, taken in the vertical plane indicated by dotted line $y\ y$ in Figs. 5, 7, and 8. Fig. 7 is a section through the entire apparatus, taken in a horizontal plane indicated by dotted line $x\ x$ in Figs. 5 and 6. Fig. 8 is a section taken in the horizontal plane indicated by dotted line W W in Figs. 5 and 6. Fig. 9 is a vertical sectional view, showing a modification of the reclaimer, with the gas and air passages surrounding horizontal tubes, through which the heated products of combustion pass. Fig. 10, Sheet 3, is a longitudinal section, taken through the entire apparatus in the vertical plane indicated by dotted line V V in Fig. 11, showing more clearly the return-passages for the products of combustion; also an exterior view of the retort. Fig. 11 is a transverse section, taken in through Fig. 10, in the vertical plane indicated by dotted line $u\ u$, showing the supernumerary gas and air passages for heating gas and air to be utilized for various purposes. Fig. 12 is a sectional view in detail, taken in the horizontal plane indicated by dotted line $t\ t$ in Figs. 10 and 11. Fig. 13 is a vertical longitudinal section, taken through the center of the upper portion of the apparatus, showing the point at which combustion takes place. Figs. 14, 15, 16, and 17 are sectional views, showing different modes of producing combustion of the heated gas and air in the combustion-chamber. Figs. 18 are enlarged views, showing different forms of tubes. Fig. 19 shows a sectional view of one form of mold, which may be heated by the combustion of heated air and gas in the combustion-chamber H′ of Fig. 13.

Similar letters of reference indicate corresponding parts in the several figures.

The invention which forms the subject of this application for a patent is designed for and may be applied to most purposes where intense heat is required, or may be found advantageous and serviceable in domestic warming apparatus, in glass-works, iron-works; also in reheating-furnaces; and, in fact, in most all mechanical, chemical, and metallurgic operations.

The drawings represent one form of apparatus, showing my invention applied to and adapted for a furnace for converting iron ore into steel sponge; but it will be shown hereinafter that I do not confine myself to this or any other special application of the invention, as the form of apparatus may be modified to suit the various purposes and applications for which it is designed, without departing from the principle of my invention.

The principle of my invention consists in obtaining a more perfect utilization of fuel and production of intense heat by means of an apparatus which is adapted for effecting the combustion of gas or gases and atmospheric air by a novel process of heating both the gas and air on their way to the mixing and combustion chamber by the heated products resulting from the combustion of these gases, and also by conducting the several currents through separate passages toward and from said combustion-chamber continuously in the same direction, thereby avoiding the cooling down of the walls of said passages below the proper temperature to effect the desired heating of the gas and air, and also obviating the necessity of alternately changing or reversing the course of the currents in opposite directions through passages of variable temperatures, as will be hereinafter specified.

An essential feature of my improvement consists in the uniformity of the heat produced by continuous currents of heated gas and air, so that when the regulators are once adjusted to produce the best advantage, or a given degree of temperature, they will require no further attention. So long as the supply of gas from a gas-holder or gas-producer is regular, the heat will continue the same.

To enable others skilled in the art to understand my invention, I will describe one practical mode of carrying it into effect.

The drawings represent the invention applied to an apparatus for making steel direct from the ore, and several of the figures show contrivances which are especially designed for use in this process of making steel. These parts will be fully described in another application for a patent which I shall hereafter make, and for this reason they will only be casually referred to in this specification.

The gas-producers, from which the supply of combustive gas or gases is obtained, may be constructed in the manner shown in Figs. 5, 7, and 10, with an inclined wall for conducting the fuel down into the chamber E, and forming a bed of fuel over the bottom grate in such manner that the upper surface or body of the fuel will be subjected to a slow smoldering heat by the action of the incandescent fuel beneath it. The gas or gases which are the result of the distillation or decomposition of the coal or other fuel used in the chamber E rise and pass off through the conduit F into a reservoir or suitable gas-holder, as shown at $F^1$, then onward through the continuation of the conduit F to a chamber, $F^2$, above two valves, $i\ i$, in passages which lead downward to the reclaimer G.

The gas-producers may be constructed in any other suitable manner, and located at any remote distance from the combustion-chamber, where the gas or gases and air are brought together and consumed. For many purposes the open-fire gas-generators, as described, may be dispensed with, and the gas generated in retorts, after the manner of making common illuminating-gas; or this latter gas may be used by making connections with the street-mains—as, for instance, where the invention is arranged and applied to a furnace for domestic heating purposes.

In the conduit F, on each side of the gas-holder, as shown in Figs. 5 and 10, valves or cut-off slides are employed, in conjunction with interposed sand-packing, for cutting off communication with the gas-generators, when this is found desirable, and also for cutting off communication between the reclaimer and gas-holder.

Where the gas is produced in the manner shown in the drawings for mechanical, chemical, and metallurgic operations, I prefer, though I do not confine myself, to conduct the process of making the gas during the continuance of said operations, for the purpose of preventing the cooling of the gas and the deposition of sulphur or other substances in the passages leading to the combustion-chamber, by passing this gas in its heated state from the gas-producers to this chamber of combustion. The gas or gases, upon reaching the chamber $F^2$, descend through the two vertical passages N $N'$, if both valves $i\ i$ are open; but if the valve of passage N only is open, the gas descends through this passage to the lowermost horizontal passage $l$, thence it ascends through a series of pipes, $j$, arranged in vertical planes, and supported in banks by means of horizontal divisional walls $k$, which pipes collectively constitute what I have denominated a "heat accumulator and reclaimer." These tubes, pipes, or conduits may be made of any suitable shape in cross-section, and any required number or size may be employed, according to circumstances. They may be constructed of metal or of more refractory substances, and united together in the manner shown in Fig. 18, Sheet 3.

In practice it will be desirable to have the uppermost tier or bank of tubes, which are exposed to the greatest degree of heat, made of some argillaceous substance, while the lower banks of tubes may be made of a less refractory substance, because they are exposed to a less degree of heat, and are more remote from the combustion-chamber H. The passages or chambers $m\ m$, through which the tubes $j$ pass, and which are produced by the horizontal partitions $k$, communicate with an ascending passage, $m'$, which finally leads off to the chimney C through the opening $e$. (Shown in Fig. 10.) These passages $m$ cause the currents of heated products of combustion escaping from the combustion-chamber H to pass in a serpentine course around the outside surfaces of the several banks of tubes $j$ successively, as indicated by the arrows in Figs. 5 and 10, and upon reaching the lowermost passage $m$ the products of combustion are allowed to pass off through the conduit $m'$.

By the term "products of combustion" I mean the heated products which result from the combustion of the gas and air in the chamber H after leaving the chamber. These products gradually descend and transmit their heat or caloric through the material of which the tubes $j$ are composed to the gas which is rising through these tubes on its way to the chamber of combustion by conduction. Thus it will be seen that the heated products of combustion, in their passage to the flue $m'$, or to some other escape flue or passage, give up their heat to the gas which is on its way to said chamber of combustion, so that they reach flue $m'$ comparatively cool. The reheated gas, after leaving the upper banks of pipes $j$, ascends through openings $n$, which are made through arches $o\ o\ o\ o$, in the direction of the arrows $b^2$, to the point of combustion H, where the heated gas mingles with the heated atmospheric air, and produces combustion. The products of combustion pass around or on both sides of the retort $A^1$, and thence descend in the direction of the arrows $b^1$ on both sides of the central partition A². From thence the products of combustion descend through the passages n' n', through the intermediate arches o o, into the chambers B' B' in the direction of the arrows b⁴. From these chambers B', Sheet 3, Fig. 10, the products of combustion pass forward and descend into the chamber m, through which the uppermost bank of tubes pass. Thence they pass backward, and circulate between and around said tubes j, and from thence they descend and circulate between and around the lower banks of tubes j, between the partitions k k, and finally escape, as hereinafter described. When valve i' in passage N' is open, the gas coming from the passages F F² descends and rises throug the pipes j in rear of the divisions k' k' k', and escape through the passages n' n', thence through passages a a and c² into and around the retort A¹ to the chimney C, as shown in Fig. 10, Sheet 3.

On the opposite side of the central division A¹ to that on which the gas-passages are arranged, I have a system of passages, chambers, and pipes constructed and arranged in a similar manner to those above described, which are designed exclusively for heating atmospheric air by the waste heat of the products of combustion in their passage from the chamber of combustion H, before mentioned, to the escape-flue d. The air enters at the upper ends of vertical passages M M, and descends through these passages to points below the lower ends of the air-heating tubes, thence through passages above these tubes, as indicated by arrows b³, to the chamber of combustion H, where it mingles with the heated gases and produces combustion. This air is highly heated in its passage to the chamber of combustion H by the heat transmitted or reclaimed from the descending products of combustion, as indicated by the arrows b⁴, as before described.

The object of the valves i i¹ i² i³ are for regulating the supply of gas and air to the combustion-chamber H, so that they may be mixed in proper proportions for producing the best results, and for regulating and modifying the intensity of heat in said chamber.

Mode of operation: The fire is kindled upon the grate-bars in the gas-generator E. The fuel is fed in on top thereof, so as to cover the grate-bars some two or three feet in thickness, and should never be allowed to burn through, but to cause a continual mild heat to pass up through the surface-fuel, which will thus be decomposed into a mixture consisting chiefly of hydrocarbon and carbonic-oxide gases. Such gases are conducted by passage F to and through the heat accumulator and reclaimer G to the chamber of combustion. At the same time a like current of air is passing through this heat-accumulator in the opposite chambers and the tubes therein to the chamber of combustion, for the purpose of supporting the combustion of the said gas. Gas may be supplied to said passage F from any other source, and consumed in like manner.

It will be seen by reference to the drawings, Fig. 10, that the reheated or superheated gas and the heated air are mixed together and consumed at the highest point of the combustion-chamber. One advantage of thus burning the gas and air is, that the higher the position and the higher the temperature of the air and gas before ignition, the greater will be the light and heat produced from a given quantity of fuel. This new feature is contrary to the mode generally adopted of igniting gas and air. I do not confine myself to igniting gas and air at such point, as I have shown in Figs. 14, 16, and 17, that this ignition may take place at different points. When the required degree of heat is obtained in the combustion-chamber, the air and gas valves are properly adjusted, as before mentioned, care being taken not to allow too much gas to flow, as a temperature can be obtained in said chamber which will melt the material thereof, and which would melt or consume most any substance placed therein. The only limit to the intensity of the heat which can be accumulated depends upon the material composing the apparatus and chamber to retain it. The amount of fuel used depends upon the radiation or the cold substances introduced into the chamber, and the amount of caloric or heat conveyed to and taken out of this chamber with them.

I am aware that Frederick Siemens, of London, England, obtained a patent in the year 1857 for "an improved arrangement of furnaces," wherein he employs a series of zigzag passages for the entrance of continuous currents of either air or gas, which are heated previously to being burned, by the products of combustion passing in an opposite direction; but Siemens does not show any provision for heating air and reheating gas, and then bringing them together in a highly-heated state in a chamber of combustion.

I am also aware that Charles William Siemens and Frederick Siemens obtained a patent in England in the year 1861 for an "improvement in furnaces" for burning gas and air in combustion-chamber, in which they show four chambers containing refractory substances, through which they pass gas and air, and conduct the products of combustion off through separate chambers until the latter are highly heated, when the cold currents of gas and air are reversed and passed through the heated chambers. By this arrangement there will be a constant varying temperature in the chambers by the absorption of heat from the said refractory substances; and the close attention of a person is required to reverse the currents and pass them through the chambers last heated by the currents of waste heat. In this case and by this arrangement a given temperature of the air and gas cannot be preserved, as the source from which they derived their heat is constantly varying.

In the patents above referred to, it is not contemplated to heat both the gas and the air by having them flow continuously in the same directions toward the chamber of combustion; and for this reason the heat in this chamber will necessarily be constantly varying, the highest degree of heat being attained immediately after the reversal of the currents of gas and air, and when the refractory substances in the chambers are most highly heated.

I am also aware that William Gorman and John Patton, of Glasgow, Scotland, have shown an apparatus for utilizing the waste heat of furnaces by heating air to be introduced into the furnace, and mixing the air with the products of combustion and flame rising directly from a fire-chamber. In this arrangement a series of pipes or tubes are employed for carrying off the waste heat and communicating more or less of it to ascending currents of air. There is no provision in this arrangement for husbanding and reheating the products of combustion, and no provision made for employing, manipulating, and regulating heated currents of air and reheated currents of gas, so that they can be conducted to and burned at any desired point. This arrangement, it will be seen, is merely one of the many modes of heating air, such as is usually employed for hot-blast furnaces.

The following are some of the advantages derived from the application of my invention: the saving of fuel; unlimited command of the heat; great purity and gentleness of flame; increased durability of furnace; uniformity of heat throughout the furnace; cleanliness and saving of space in the building; complete and immediate command of the intensity and quality of the heat for producing chemical changes in metallurgical operations; the consumption of smoke, owing to the perfect combustion of the fuel of gases, which makes this furnace beneficial in large manufacturing towns; the economy and advantage of burning small coal-dust, peat, sawdust, cane or corn stalks, tan—in fact, any kind of fuel or carbonaceous matter as fuel may be used.

By reheating or superheating the gas, and using it in conjunction with heated atmospheric air, I avoid the abstraction of heat from the air at and near the point of combustion. I am enabled to distribute a given or greater quantity of heat equally in the gas and air, which it would be impracticable to communicate to the air or gas alone. I cause such an expansion of the gas and the air by heating them both that a more intimate and perfect commingling of them is obtained, and, consequently, a more perfect and thorough combustion is the result.

What I claim as new, and desire to secure by Letters Patent, is—

1. The employment, in a chamber or chambers, of a series of tubes, arranged in such manner that the exterior surface of said tubes are exposed to or are in communication with the waste-heat passages in the chamber in which said tubes are arranged, and the space or passages between the tubes in said chamber are in communication with the chamber of combustion, and also to and with the passages leading to the chimney, and the interior of said tubes or passages therethrough are in communication with a separate chamber or passage leading from the gas-generating furnace to and through the interior of the said tubes to the chamber of combustion, when the foregoing is combined with substantially a similar chamber, series of tubes, spaces, passages, and communications, the interior of such latter series of tubes being in communication with the passage leading from the open air to and through the interior of the said tubes to the chamber of combustion, substantially as described.

2. The combination, in or with a gas-generating furnace, of a chamber or chambers containing a series of tubes made hot by the waste heat produced by the combustion of gas and air heated in these passages as separate currents to the place of combustion, in a direct or continuous manner, by opposite surface-action or passage of the heat through the material of which said tubes are composed, substantially as described.

3. The employment of a series of tubes, so arranged that they may be heated by the products of combustion produced by the mingling together of heated air and gas, when said air and gas have been heated by heat communicated through the material of which the said tubes are composed, substantially as described.

4. The employment of a chamber or chambers containing a series of tubes, so arranged as to present an extensive caloric-absorbing surface, and conducting heat through the material of which said tubes are composed, and communicating it to and heating a current or currents of air and gas or gases passing on or over the opposite side of the said tubes.

5. Constructing chambers with a series of tubes for the entrance of continuous currents of air and gases for supporting combustion in a separate chamber, which currents are heated by waste heat or the products of combustion of such heated currents, passing in opposite directions or nearly opposite directions, and on opposite sides of said tubes, and through the material of which they are composed, for the purposes specified.

6. Making provision for heating air and reheating gas on their passage to a chamber of combustion by the heated products resulting from combustion in said chamber, when said gas, air, and heated products flow through their respective passages without requiring reversal, substantially as specified.

THOS. J. CHUBB.

Witnesses:
WALTER HINCHMAN,
JOHN KINGDON.